Dec. 13, 1960  R. N. DOBSON  2,963,986
COMBINED HIGHWAY AND RAIL FREIGHT UNITS
Filed Oct. 25, 1956  3 Sheets-Sheet 1

INVENTOR
RICHARD N. DOBSON
BY: Fetherstonhaugh & Co
ATTORNEYS

Dec. 13, 1960 R. N. DOBSON 2,963,986
COMBINED HIGHWAY AND RAIL FREIGHT UNITS
Filed Oct. 25, 1956 3 Sheets-Sheet 2

INVENTOR
RICHARD N. DOBSON.
BY: Fetherstonhaugh & Co
ATTORNEYS

Dec. 13, 1960 R. N. DOBSON 2,963,986
COMBINED HIGHWAY AND RAIL FREIGHT UNITS
Filed Oct. 25, 1956 3 Sheets-Sheet 3

*INVENTOR*
*RICHARD N. DOBSON*
BY: *Fetherstonhaugh & Co*
ATTORNEYS

United States Patent Office 2,963,986
Patented Dec. 13, 1960

2,963,986

COMBINED HIGHWAY AND RAIL FREIGHT UNITS

Richard N. Dobson, Burlington, Ontario, Canada, assignor to Dominion Foundries and Steel Limited, Hamilton, Ontario, Canada Filed Oct. 25, 1956, Ser. No. 618,335

4 Claims. (Cl. 105—4)

This invention relates to improvements in combined highway and railroad freight vehicles of the type which may be used as either highway transport trailers or railroad freight cars.

A number of combination cars have been proposed for use as highway transport trailers and railroad freight cars and while the principle of such a combination is inherently sound, many of the proposed constructions have been awkward, cumbersome and mechanically impractical.

The object of the present invention is to produce a freight carrying vehicle which does not depart in general proportions, weight and construction from a standard highway trailer of substantially the same load capacity and which for railroad use may be readily moved by its highway tractor into position to rest upon and extend between a pair of independant railroad trucks and wherein each truck supports the adjacent ends of two vehicles in such a manner that a uniform weight distribution on each of the axles of said truck is obtained by mounting the ends of such vehicles for vertical and lateral swinging movement about the central vertical axis line of the supporting railroad truck.

A further feature of the invention is to provide a railroad truck having a draft gear element pivotally mounted thereon for vertical swinging movement about the central vertical axis of the truck and formed with a coupling tongue receivable and lockable within a socket arranged within the rear end sill of a supported vehicle frame, the draft gear element being also mounted for lateral swinging movement in relation to the railroad truck and carrying a standard "fifth wheel" bearing and coupling plate mounted thereon for vertical swinging movement substantially directly above the pivotal mounting of the draft gear element and upon which the complementary "fifth wheel" bearing plate of the front end of the vehicle frame rests. By the use of this construction wherein the loads are centrally disposed of the truck and arranged for pivotal movement about the truck center line it is practical to use trucks which are of relatively light weight in comparison to flat car trucks which have to be of sufficient capacity to carry the weight of the flat car plus the weight of its load.

The invention also embraces novel constructions and arrangements of parts as shall fully appear, it being understood that the drawings merely show and the specification merely describes one embodiment of the invention which is given by way of example only.

Figure 5:
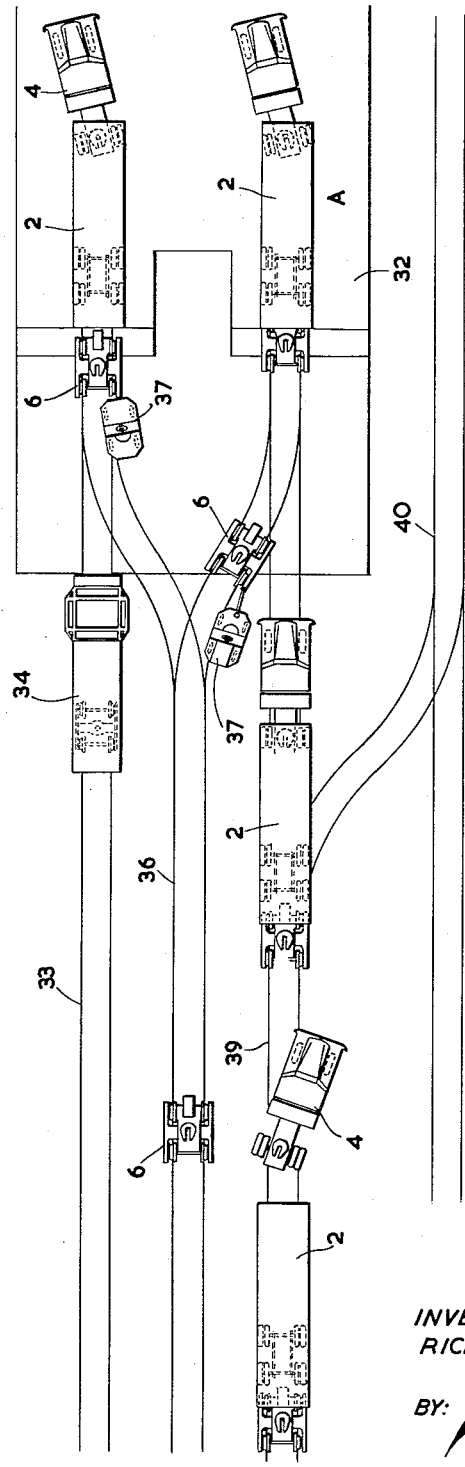
Fig. 5 is a schematic plan view of railroad marshalling tracks and showing how trains according to my invention may be built up and broken up.

The combined highway and railroad freight vehicle comprises in general a vehicle 2 constituting a highway transport trailer having standard rear road wheels 3 and designed to be coupled to a tractor 4 and to swingably rest upon its "fifth wheel" bearing plate 5 as is in standard practice, and when used as a railroad freight car to be mounted upon a pair of similar independant railroad trucks 6 which in their lower wheel carrying portions follow standard design and including the usual air brake arrangements. The vehicle 2 is also fitted with standard retractable forward end supporting wheels 7, upon which the forward end of the vehicle may be supported when it is disconnected from the tractor.

Figure 3:
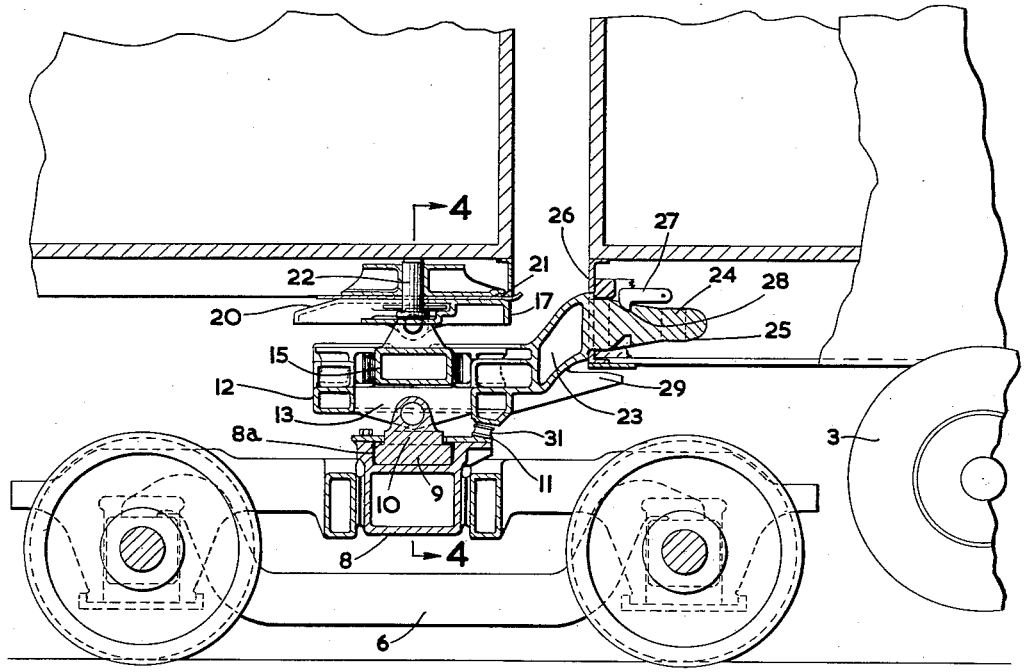
Fig. 3 is a further enlarged partly sectional side elevational view showing the ends of two transport vehicles coupled to and resting upon a railroad car truck.
Figure 4:
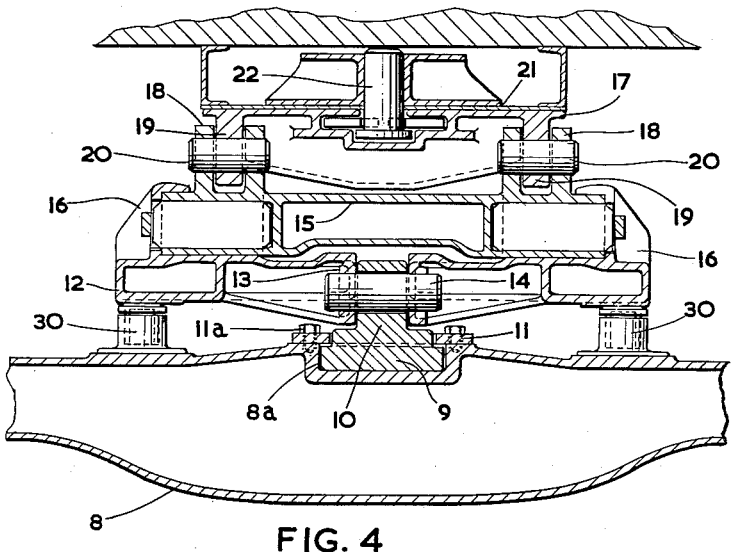
Fig. 4 is a still further enlarged cross-sectional view through the upper portion of the car truck and taken through the line 4—4 Fig. 3.
Figure 1:
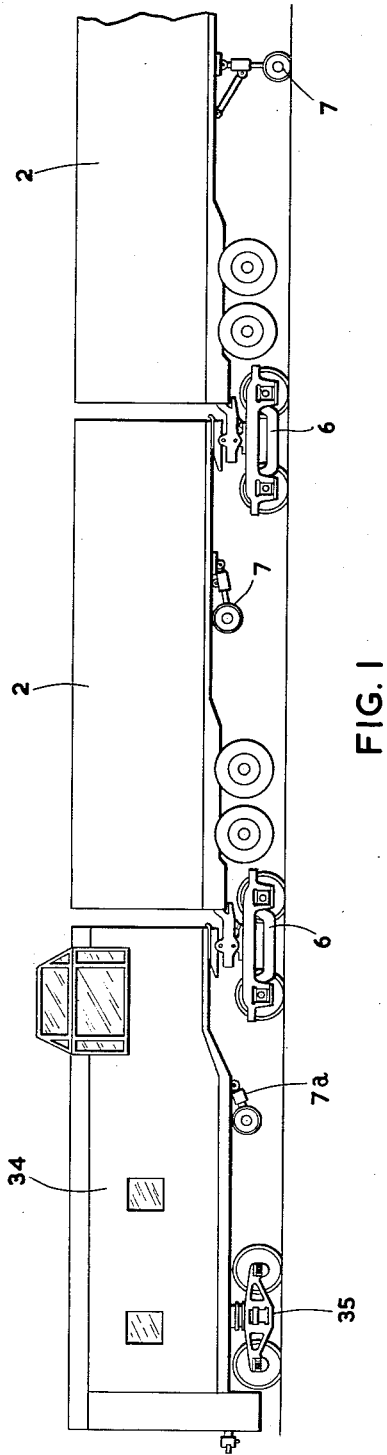
Fig. 1 is a side elevational view of part of a railroad freight train made up of several highway transport vehicles mounted upon railroad car trucks.

As shown in the drawings, each railroad truck 6 supports the adjacent ends of two vehicles 2, and upon reference to Figs. 3 and 4 the simplicity and practicability of such supporting arrangement will be evident. The bolster 8 extends transversely of the truck in the usual manner and is formed with a cup shaped bearing recess 8$^a$ centrally of its top face for the reception of a bearing boss 9 on the lower portion of a block 10, the boss being retained in position by a retainer plate 11 having an orifice through which the block turnably protrudes and the plate secured in place upon the bolster by studs 11$^a$. A casting 12 of generally rectangular shape is positioned above the block 10 and formed with a pair of downwardly extending flanges 13 which straddle the sides of the block paralleling the direction of movement of the vehicle. A bearing pin 14 extends transversely through orifices in the flanges and the block whereby the casting 12 is free to rock as well as being capable of turning movement in conjunction with its supporting block 10 which has its bearing boss 9 rotatably contained within the bolster bearing recess 8$^a$.

A second generally rectangular casting 15 housing the standard draft gear and follower assembly, which forms no part of the essentials of the invention, is secured upon the top of the casting 12 by tongues 16 formed integrally with the upper portion of the casting, but permitting relative movement with respect to casting 12 only in the direction of motion of the vehicle, restrained only by the action of the draft gear and its followers against stops embodied in casting 12 as is usual in such draft gears. A "fifth wheel" bearing plate 17 is positioned above and mounted upon the casting 15 for vertical swinging movement in the plane of the direction of movement of the vehicle. The plate mounting comprises a pair of yokes 18 carried upon the upper face of the casting 15 to each straddle one of two pendant lugs 19 on the lower face of the plate 17. Pivotal pins 20 with their axes in alignment extend through aligned orifices in each yoke and contained lug assembly. The plate 17 follows standard practice in design, i.e. having a king pin receiving slot extending from its periphery to its center and at which portion the plate is inclined for the sliding follows standard practice in design, i.e., having a king pin 22, the plate 17 also containing the usual king-pin locking device which is customary in fifth wheel assemblies.

For the coupling and support of the other vehicle the casting 12 is formed with an integral coupling tongue 23 carrying a substantially horizontally directed coupling pin 24 positioned to enter and fit within a socket 25 formed centrally of the end sill 26 of the vehicle frame. To retain the coupling pin in place a manually swingable latch 27 is positioned to swing into the socket and enter a groove 28 in the coupling pin and thus retain the pin in place until the coupling is broken through the latch being manually lifted. To retain the coupled vehicle against excessive rock about the coupler pin, the coupling tongue 23 carries a transverse bearing ledge 29 which will buffer the bottom of the sill 26 and thus restrain excessive rock of the vehicle.

To give additional side bearing support for the turnable casting 12 resilient side bearings 30 (Fig. 3) are mounted upon the top face of the bolster 8 and upon which the bottom face of the casting slides in its turning movement. Also to retain the axis of the coupler pin 24 approximately horizontal for ready insertion into the socket 25, a resilient buffer stop 31 (Fig. 3) is mounted upon the top face of the retainer plate 11 to constitute a stop against excessive downward movement of the coupling tongue 23 before being coupled to a vehicle.

Figure 2:
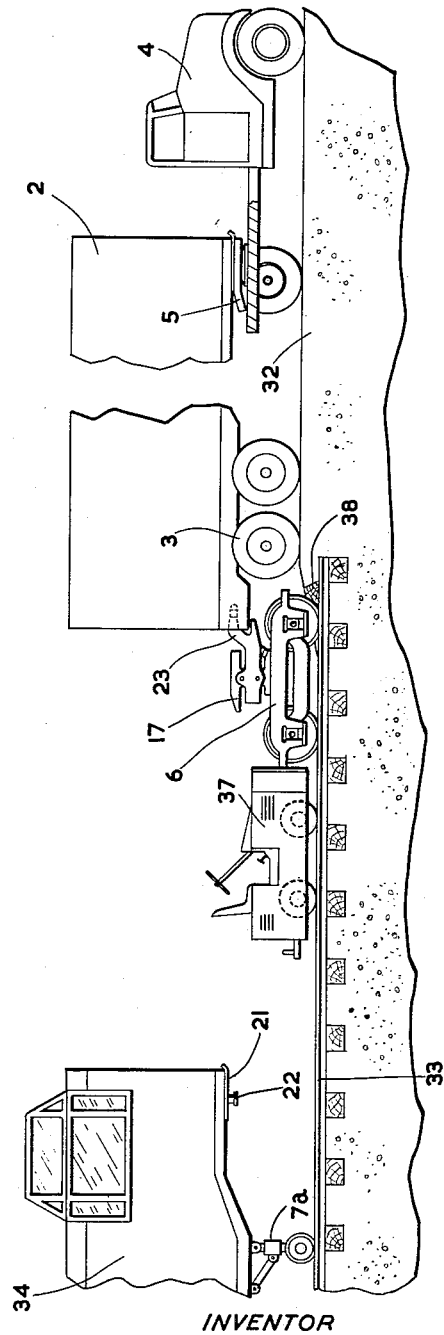
Fig. 2 is an enlarged side elevational view showing a highway vehicle tractor coupling its vehicle to the end of the train.

In building up a train at an interchange depot, as shown in Figs. 2 and 5, a number of trailer vehicles 2 with their tractors 4 are assembled and are successively backed along a ramp 32 higher than the rails of the railroad marshalling track 33.

To commence this operation a caboose unit 34, preferably permanently mounted upon a standard railroad truck 35 at its rear end is positioned on the marshalling track 33 with its forward end resting on its retractable forward end supporting wheels 7ᵃ. A truck unit 6 is then run on to the marshalling track 33 from a siding track 36, being pushed along said track by a power mule 37 to stops 38 at the end of the ramp 32 and held at this position by the mule or by any other means to prevent movement of truck 6 away from said stops. A trailer vehicle 2 is then driven into alignment with the truck 6 by its tractor 4 and backed until the coupler pin 24 of the coupling tongue 23 of the truck 6 (Fig. 3) enters the socket 25 in the end of the vehicle frame, the locking latch 27 being then securely engaged with the coupler pin. The mule 37 or other means for restraining movement of truck 6 is then removed and the trailer 2 now coupled to truck 6 moved along track 33 by tractor 4 to a position wherein its fifth wheel plate 17 slides under the caboose fifth wheel plate 21 with the caboose trailer king pin 22 entering the slot in plate 17. The two fifth wheel plates are then coupled by any suitable mechanism following standard road tractor and transport trailer coupling arrangements. When this has been done the retractable forward end supporting wheels 7ᵃ upon the caboose unit are retracted and the caboose and trailer vehicle moved rearwardly until the trailer vehicle 2 is approximately in a position on the track previously occupied by the caboose.

The retractable forward end supporting wheels 7 of trailer 2 are then lowered to support the forward end of the trailer and tractor 4 is then disengaged from trailer in the manner standard in road tractor and transport trailer coupling arrangements. A second truck unit 6 is then run from the siding track 36 on to track 33 and moved to the stops 38 at the ramp 32 and held as previously described. A second trailer vehicle is backed into position by its tractor and connected to the coupling pin 24 of the second truck 6. The second trailer 2 supported on the second truck 6 is then moved rearwardly whereby the second truck engaged the fifth wheel plate on the forward end of the first trailer, the operation being continued as previously described until the train is built up.

Fig. 5 also includes tracks 39 and 40 for incoming trains which are brought to rest upon the track 39, the locomotives being switched on to the siding track 40. After the arrival of a train the retractable supporting wheels 7 of the trailers 2 making up the train are lowered to support the forward ends of their trailers apart from the support of their trucks 6 and the fifth wheel plates 17 and 21 uncoupled to permit independant movement of the trailers 2 as the train is being broken up. The truck 6 of the first trailer 2 is uncoupled from the trailer and moved on to either of the siding tracks 36 or 40 by a mule 37. A road vehicle tractor 4 is then backed into position and coupled to the trailer in the usual manner. When this has been done the supporting wheels 7 of the trailer are retracted and the tractor 4 driven forwardly to pull the trailer and its rear end supporting truck 6 into the position A in Fig. 5 which is similar to the position shown in Fig. 2 and wherein the road wheels 3 are resting upon the ramp 32 and supporting the trailer. The coupling pin 24 of the truck tongue 23 is then unlatched and the tractor and trailer driven away. The truck 6 then being free to be transferred to a siding track by a mule. The same operation is continued in breaking up the remainder of the train.

What I claim as my invention is:

1. In a combined highway and rail freight unit, a pair of trailer vehicles each having a "fifth wheel" coupling plate at its forward end and adapted to be mated with and rest upon a coupling "fifth wheel" plate of a highway tractor and rear wheels to support the rear end of the vehicle while moving along a highway, each trailer vehicle also having a coupling member receiving element located centrally of its rear end; a railroad truck upon which the adjacent ends of a pair of trailer vehicles may be detachably mounted and comprising a truck sub-frame having rail engaging wheels, a top frame assembly for supporting the adjacent ends of a pair of trailer vehicles, said top frame being turnably and rockably mounted upon the sub-frame, a freely rockable "fifth wheel" plate forming the upper portion of the top frame assembly and mounted upon the top frame for rockable movement independently of the turnable and rockable movement of the top frame and for the reception and support of the "fifth wheel" plate of one of a pair of trailer vehicles, and a coupling tongue positioned below the top frame "fifth wheel" plate and carried by the top frame to turn and rock therewith and detachably insertable within a tongue receiving socket carried by the end of the other vehicle and upon which coupling tongue said end of the vehicle is solely supported.

2. The construction as defined in claim 1, wherein the top frame assembly of the railroad truck is rockably mounted upon the sub-frame about a horizontal axis substantially intersecting the prolongation of a vertical axis about which the top frame assembly is turnable relatively to the sub-frame, and wherein the axis of the rockable "fifth wheel" plate forming the upper portion of the top frame assembly is parallel to and positioned substantially directly above the horizontal axis about which the top frame assembly is rockable.

3. In a combined highway and rail freight unit, a pair of trailer vehicles each having a "fifth wheel" coupling plate at its forward end and adapted to be mated with and rest upon a coupling "fifth wheel" plate of a highway tractor and rear wheels to support the rear end of the vehicle while moving along a highway, each trailer vehicle also having a coupling member receiving element located centrally of its rear end; a railroad truck upon which the adjacent ends of a pair of trailer vehicles may be detachably mounted and comprising a truck sub-frame having rail engaging wheels, a top frame assembly for supporting the adjacent ends of a pair of trailer vehicles, said top frame being turnably and rockably mounted upon the sub-frame, a freely rockable "fifth wheel" plate forming the upper portion of the top frame assembly and mounted upon the top frame for rockable movement independently of the turnable and rockable movement of the top frame and for the reception and support of the "fifth wheel" plate of one of a pair of trailer vehicles, and a horizontally extending coupling tongue positioned below the top frame "fifth wheel" plate and protruding from the top frame to turn and rock therewith and detachably engage the coupling receiving element carried by the end of the other vehicle and upon which coupling member said end of the vehicle is solely supported.

4. The construction as defined in claim 3, wherein the top frame assembly of the railroad truck is rockably mounted upon the sub-frame about a horizontal axis substantially intersecting the prolongation of a vertical axis about which the top frame assembly is turnable relatively to the sub-frame, and wherein the axis of the rockable "fifth wheel" plate forming the upper portion of the top frame assembly is parallel to and positioned substantially directly above the horizontal axis about which the top frame assembly is rockable, the top frame assembly and its "fifth wheel" in the direction of movement of the vehicles.

References Cited in the file of this patent

UNITED STATES PATENTS

| | | |
|---|---|---|
| 1,365,087 | Buss | Jan. 11, 1921 |
| 1,858,769 | Erskine | May 17, 1932 |
| 2,036,535 | Nelson | Apr. 7, 1936 |
| 2,066,836 | Hughes | Jan. 5, 1937 |
| 2,142,411 | Ramsey | Jan. 3, 1939 |
| 2,150,116 | Farr | Mar. 7, 1939 |
| 2,513,552 | Dove | July 4, 1950 |
| 2,709,969 | Andert | June 7, 1955 |
| 2,804,315 | Guye | Aug. 27, 1957 |
| 2,839,012 | Gutridge | June 17, 1958 |